July 2, 1940.   R. MORDIN   2,206,550
REMOTE CONTROL APPARATUS
Filed June 16, 1936   5 Sheets-Sheet 4

INVENTOR
Ralph Mordin.
BY
HIS ATTORNEY

Patented July 2, 1940

2,206,550

UNITED STATES PATENT OFFICE 2,206,550

REMOTE CONTROL APPARATUS

Ralph Mordin, Westminster, England, assignor, by mesne assignments, to The Union Switch & Signal Company, Swissvale, Pa., a corporation of Pennsylvania Application June 16, 1936, Serial No. 85,544 In Great Britain May 2, 1934

15 Claims.   (Cl. 246—3)

This invention relates to centralized traffic control apparatus for railroads such as is employed for the purpose of transmitting control signals and indications of train movements from one station or other point on the track to another, and has for its object the provision of improved apparatus of this character.

The invention more particularly relates to train describing apparatus of the kind in which the transmitting apparatus at a station or other point of control and the receiving apparatus at a remote point are connected together by a single pair of line conductors through which descriptions of the destination, class or other particulars of a train are transmitted in the form of electric current impulses as has previously been proposed in various forms of such apparatus and in accordance with one feature of the invention each train description is identified by a code signal comprising one or more current impulses of a distinctive character as regards polarity, for instance, distributed in a manner characteristic of the particular train description in a series of impulses the remainder of which are of a different character, the operation of the transmitting apparatus being arranged to be controlled by the receiving apparatus in such a manner that each successive impulse can be transmitted only after the preceding impulse has been properly received so that the transmitter and the receiver are automatically kept in step with one another.

The present application is a continuation-in-part of my pending United States application for Letters Patent, Serial No. 19,461, filed May 2, 1935.

I will describe two forms of apparatus embodying my invention, and several modifications of portions thereof, and will then point out the novel features of my invention in claims.

Figure 1:
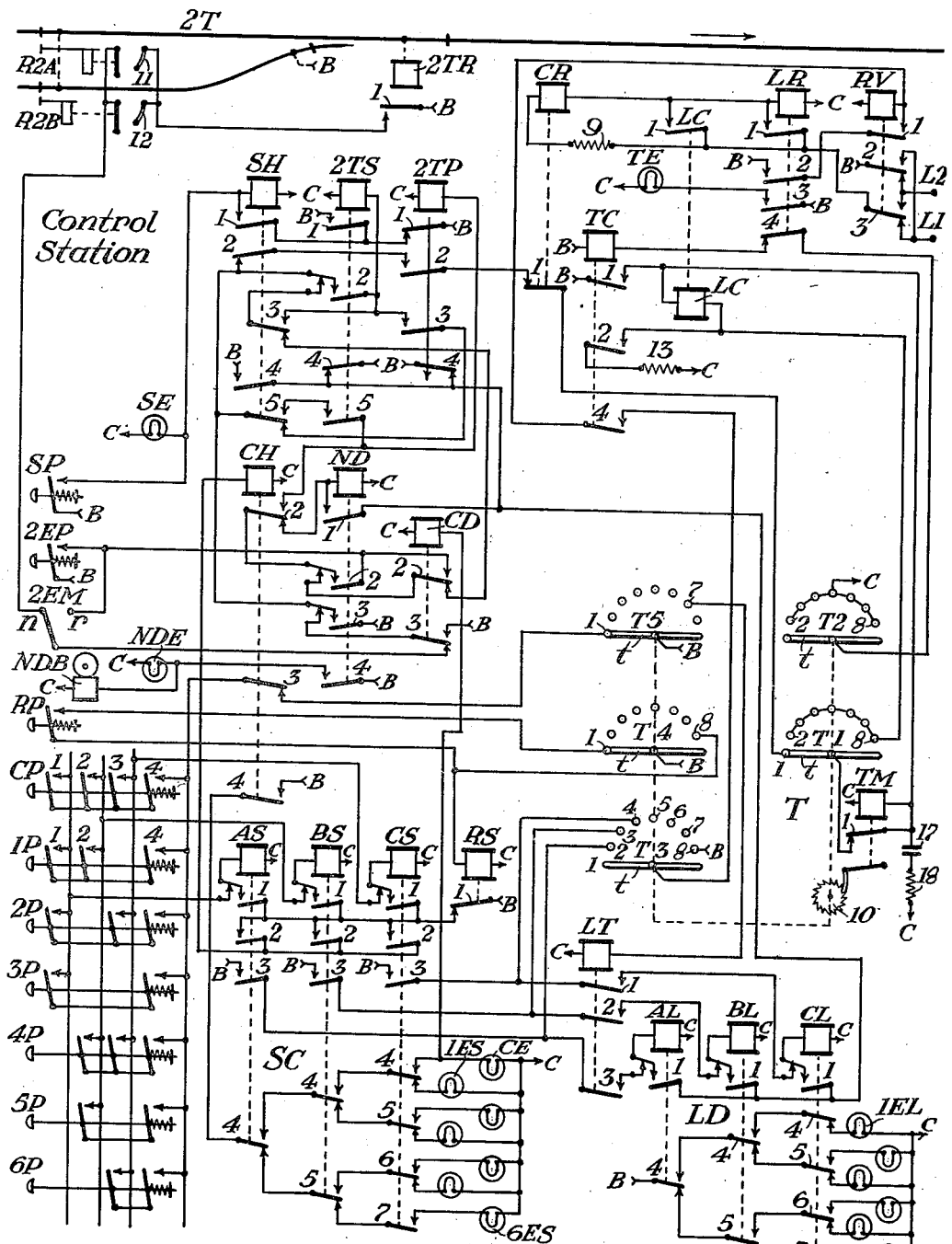
Figure 2:
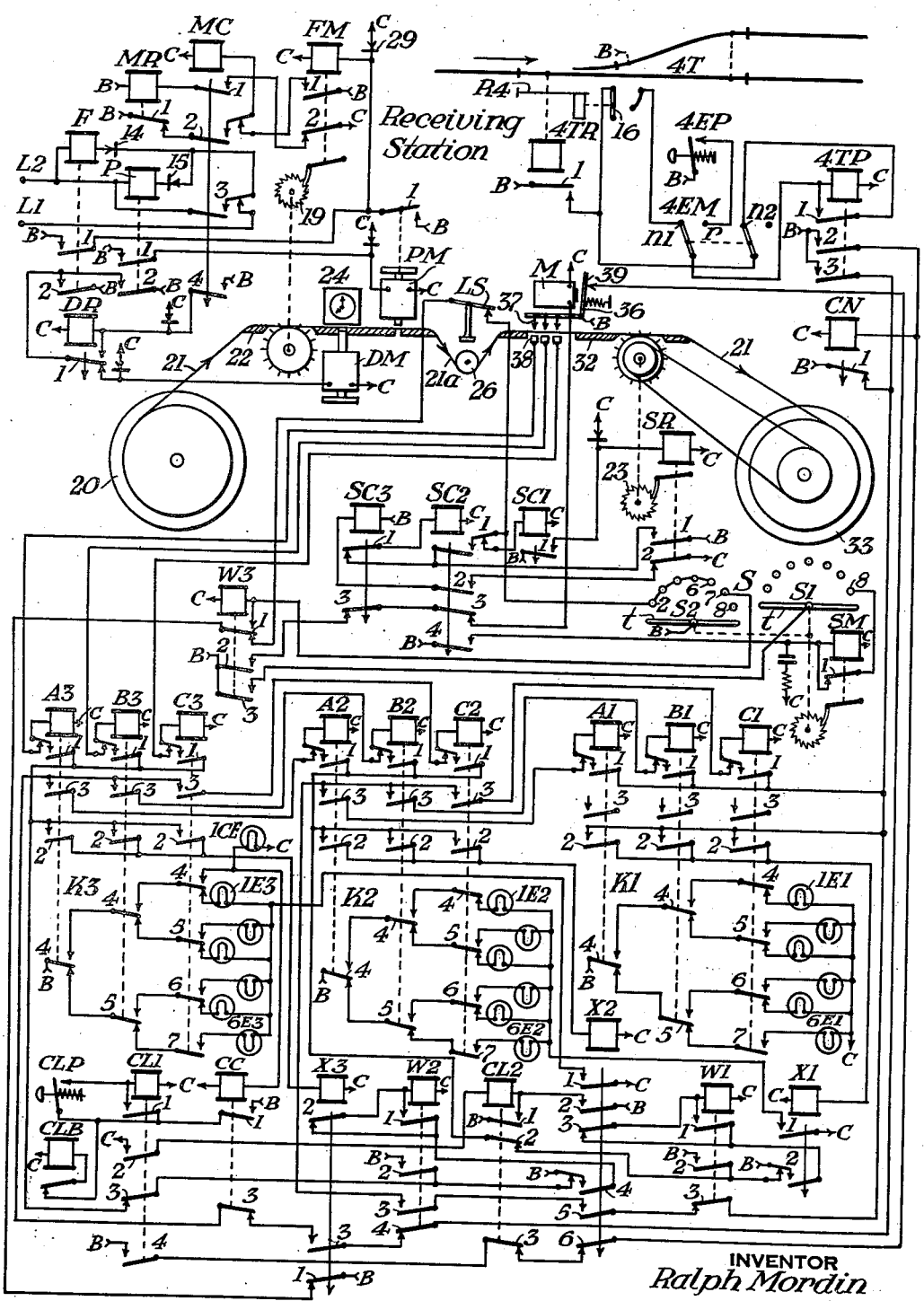
Figure 3:
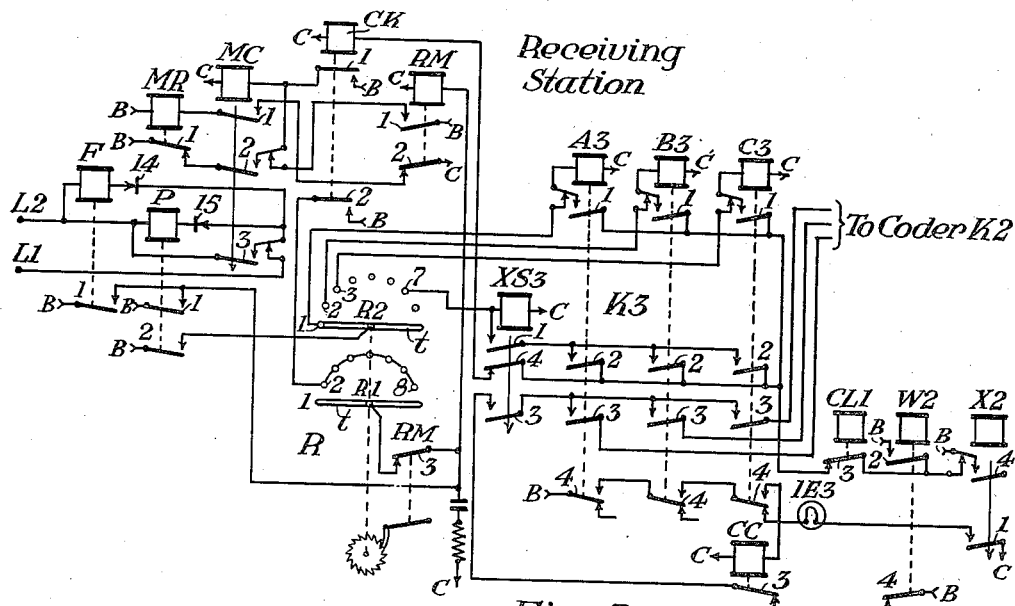
Figure 4:
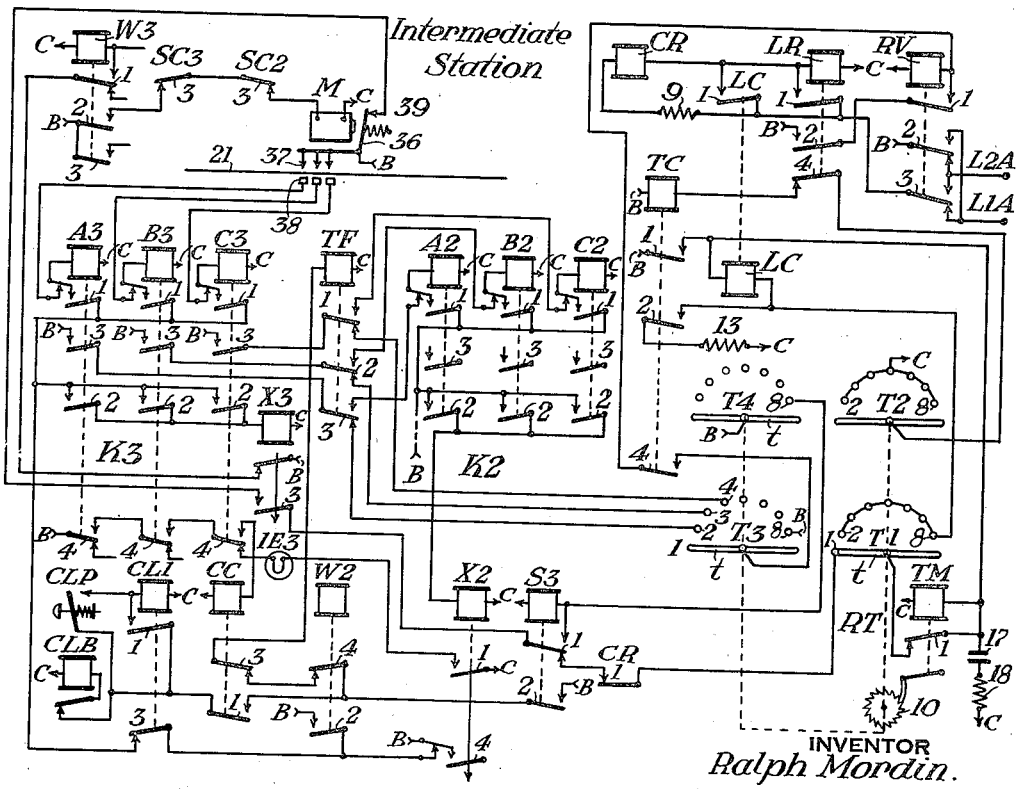
Figure 5:
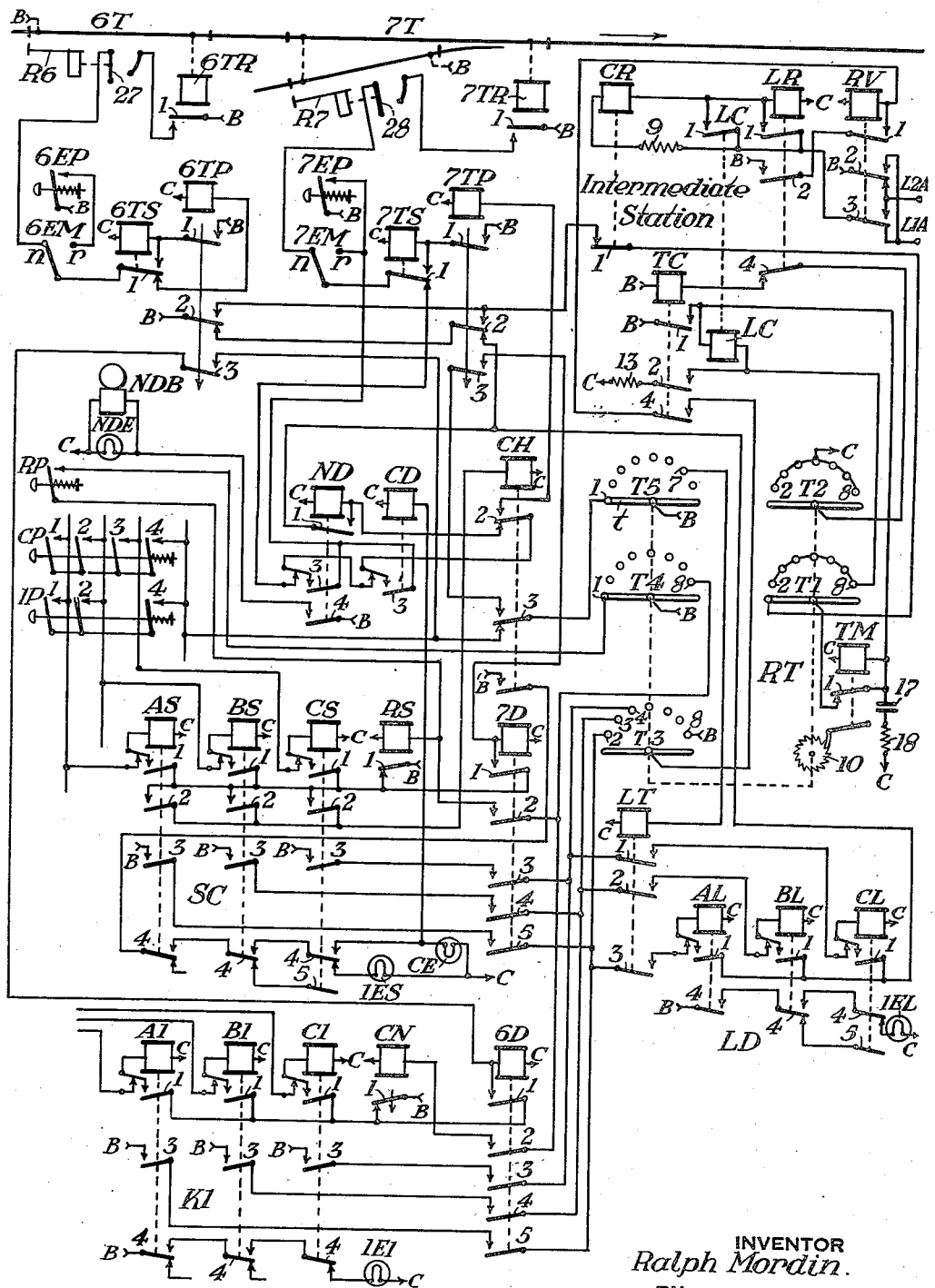
Figure 6:
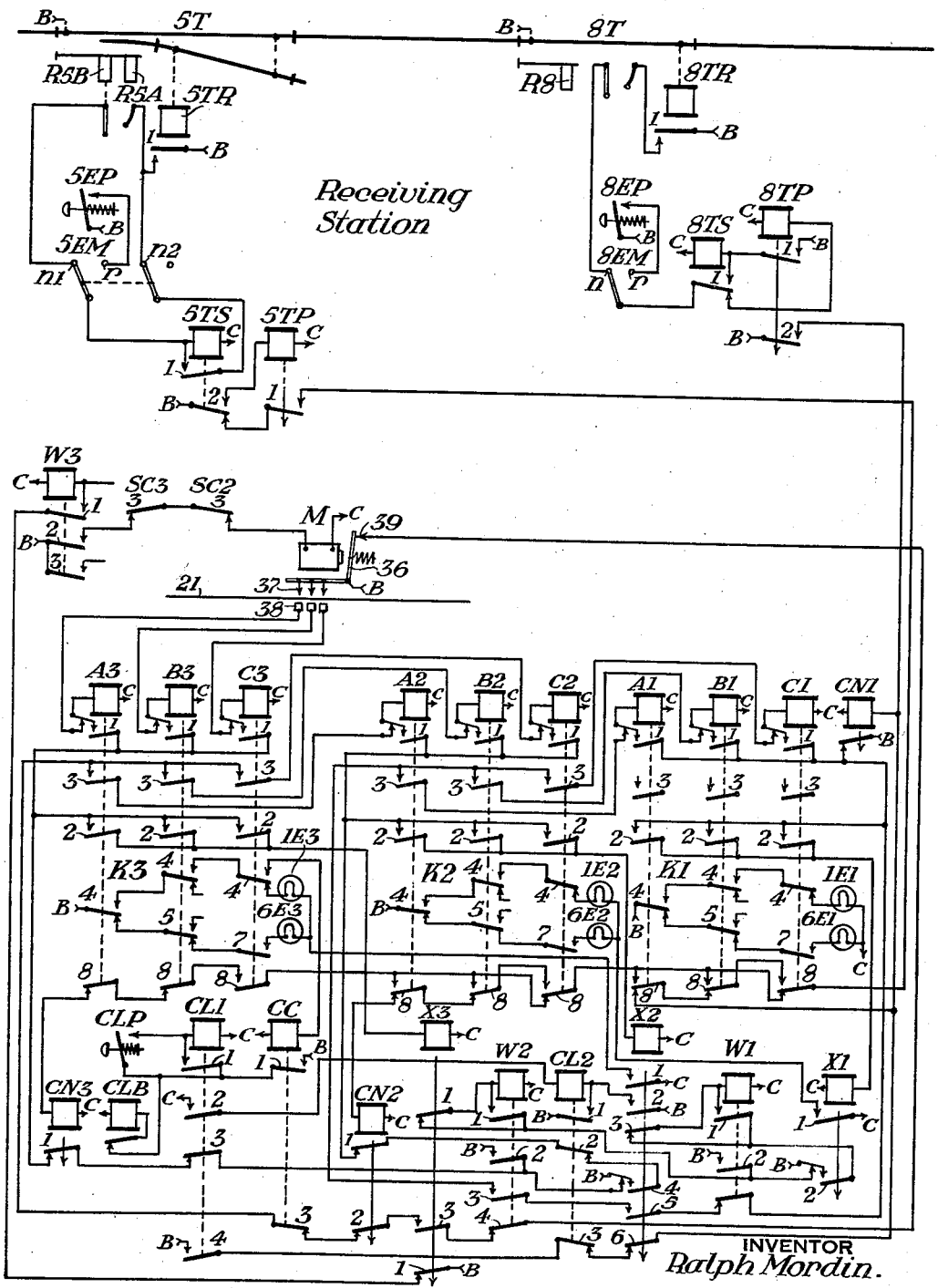

Referring to the accompanying drawings, Fig. 1 is a diagrammatic view of the apparatus for transmitting train descriptions from one point on a railway track. Fig. 2 is a corresponding view of the receiving and storing apparatus at another point on the track. Fig. 3 shows an alternative form of receiving apparatus for governing the storing apparatus of Fig. 2. Fig. 4 is a view of apparatus at an intermediate point similar to that of Fig. 2 but modified to include arrangements for re-transmitting the train descriptions to a further point. Fig. 5 is a view of apparatus similar to that of Figs. 1 and 2 arranged to interpose additional train descriptions at an intermediate point. Fig. 6 illustrates a modification of Fig. 5 including arrangements for selectively cancelling certain of the stored descriptions.

Similar reference characters refer to similar parts in each of the several views.

The invention in the form first to be described is embodied in train describing apparatus of the ribbon storage type in which holes are arranged to be punched in a record tape or ribbon at positions therein corresponding to the various train descriptions and in this form of the invention each train description corresponds to a predetermined number of serial steps or sections of the ribbon which is the same for all descriptions, one or more of these steps or sections being punched so that the position of the hole or holes in the series is characteristic of a particular train description.

Referring now first to Figures 1 and 2, it will be seen that the transmission apparatus shown in Figure 1 is connected to the receiving apparatus shown in Figure 2 by two line wires L1 and L2. The apparatus shown in Figure 1 comprises a set-up coder SC adapted to cooperate with a stepping transmitter switch T including a plurality of rotary switches, each of which comprises a number of contacts arranged to be successively engaged by a rotatable contact arm $t$ as a stepping magnet TM is repeatedly operated. In the specific embodiment of the invention herein illustrated, contacts 2, 3, 4 of the rotary switch T3 are utilized for the transmission of recording impulses of positive polarity while any of these contacts not thus employed for a particular train description together with a series of further contacts 5, 6, 7 are utilized for the transmission of spacing impulses of negative polarity, while contact 8 is used to transmit a final impulse of positive polarity. The transmitter also comprises a number of keys or plungers 1P to 6P, inclusive, each corresponding to a particular train description and adapted when manually operated to energize one or more of three relays AS, BS, CS in the set-up coder SC which in turn connects one or more of the contacts 2, 3, 4 of the rotary switch T3 to the positive terminal B of a source of direct current.

It is to be understood that in practice switch T may have more than eight steps and the coders will usually include one or more additional relays corresponding to steps 4, 5, etc., of switch T, which obviously will provide additional code combinations and will permit the transmission of a larger number of descriptions, but that as herein illustrated a code of but seven line impulses and only the first three relays are shown in order to simplify the drawings.

A line pole-changer relay RV is provided, one terminal of which is connected to the negative terminal C of the source of current above referred to, the other terminal being connected through front contact 4 of a transmitter control relay TC to arm t of switch T3. The relay RV is provided with pole-changing contacts 2, 3 for controlling the polarity of the impulses delivered to the line circuit.

The line circuit is normally closed from terminal B, back contact 2 of relay RV, terminal L2, through the line wires and the apparatus at the receiving station to terminal L1, back contact 3 of relay RV, resistor 9, the line detector relay CR, line relay LR to terminal C. Relay CR is a high resistance relay held energized by a relatively small current insufficient to operate relay LR or the line relays at the receiving station which, therefore, normally occupy their released positions.

When a train description is set up on the set-up coder SC by the actuation of the appropriate key or plunger such as IP, a checking relay CH is energized, and then a check lamp such as IES which corresponds to the plunger that has been operated becomes lighted, thereby informing the operator that the correct code combination has been set up.

When the corresponding train leaves the control station as indicated by the occupancy of a track section 2T, the deenergization of the track relay 2TR causes a repeating relay 2TP to be temporarily energized and this causes the arms t of the transmitter switch T to move out of engagement with their first fixed contacts 1 as shown and into engagement with their second fixed contacts 2. At the same time a line relay LR is picked up by the action of a line control relay LC, and a stick circuit for relay LR is completed including the line wires L1, L2 and the back contact 3 of the release relay MC of Fig. 2.

At the receiving station a feed relay F connected in series with a rectifier 14 and a punch relay P connected in series with a rectifier 15 are connected across line wires L1 and L2, the rectifier 15 being connected in the opposite direction to the rectifier 14.

In the event of the contact 2 of the transmitter switch T3 not being positively energized by the action of the coder SC as above explained the relay RV will evidently not be energized so that the circuit for the first impulse will be from the positive terminal B of a source of current through back contact 2 of relay RV, line wire L2, the relay F, rectifier 14, back contact 3 of relay MC, line wire L1, back contact 3 of relay RV, front contact 1 and winding of relay LR, to the negative terminal C of the source.

If, on the other hand, the contact 2 of the transmitter switch T3 is positively energized by the action of the coder SC, the relay RV will be energized and the circuit for the first impulse will be from the positive terminal B through front contact 2 of relay RV, line wire L1, back contact 3 of relay MC, rectifier 15, relay P, line wire L2, front contact 3 of relay RV, front contact 1 and winding of relay LR to the negative terminal C.

In either case it will be seen that the relay LR is maintained energized during the impulse and the latter will energize one or other of the relays F or P so that a positive impulse traverses the relay P and a negative impulse traverses the relay F.

The receiving apparatus comprises a drum 20 carrying a roll of paper record ribbon or tape 21, which is arranged to be fed forward off the drum 20 by the ratchet mechanism 19 so as to pass over a plate or table 22 above which is arranged an electrically operated punch mechanism having an operating magnet PM.

The reception of an impulse by relay P causes a circuit to be completed for the punch mechanism PM from the positive terminal B of the source, front contact 1 of relay P, magnet PM to terminal C, and the operation of magnet PM causes a circuit to be completed for magnet FM of the feed ratchet mechanism 19 from terminal B, front contact 1 of magnet PM, magnet FM to terminal C.

The reception of an impulse by relay F causes a circuit to be completed for the operating coil FM of the feed ratchet mechanism only from the positive terminal B of the source, front contact 1 of relay F, magnet FM to terminal C.

It is arranged that relay MC is energized over front contact 1 of magnet FM when both the punch mechanism PM and the feed ratchet mechanism FM have fully energized in the first case, or when the feed ratchet mechanism has fully energized in the second case, as will be apparent from the drawings.

The energization of MC opens the line circuit at its back contact 3 and completes a snubbing circuit for the relay F or P so that these relays together with relay LR are deenergized. The deenergization of relay LR permits the arms t of the transmitter switch T to move into engagement with the next fixed contacts 3, a similar cycle of operations occurring at each step of the transmitter switch, and the apparatus is so arranged that arms t of the transmitter switch T cannot move through another step until relay LR is deenergized and this only occurs when relay MC has been energized by the complete energization of the feed ratchet mechanism and also the punch mechanism, if the current impulse is a positive one.

The release of F or P is delayed somewhat by the gradual discharge of the current through the associated rectifier, and when this occurs it releases the feed magnet FM in either case and the punch magnet PM as well in the case of relay P. A rectifier 29 is connected in parallel with magnet FM in order to provide a discharge path for the inductive energy stored in the magnet to prevent contact sparking when its energizing circuit is opened. Similar arrangements are provided for each of the magnets such as FM as will be apparent from the drawings.

The feed ratchet mechanism 19 is so constructed that the record ribbon 21 is fed forward through one step of suitable length, when the feed mechanism has completely returned to its normal position, and it is arranged that relay MC remains energized until this occurs together also with the complete release of the punch mechanism PM if the impulse was one of positive current in which P operated. This is accomplished by the provision of a holding circuit for relay MC including back contact 1 of an auxiliary relay MR, which relay has an energizing circuit including front contact 1 of relay MC and back contact 2 of magnet FM. The deenergization of relay MC again completes the line circuit so that the next impulse can be sent.

The cycle of operation above described is then repeated for the third recording step so that the record ribbon 21 at the receiver is fed forward through three successive steps one or more of which contains a punched hole. The transmitter switch T continues to operate in a similar manner to cause the ribbon 21 at the receiver to be fed forward through a further series of three spacing steps none of which are punched and then through a final or seventh step which is punched to define the end of the train description.

At the receiver as soon as the ribbon 21 has been fed forward through one or a predetermined number of steps the loop formed by the ribbon 21 in passing from the plate 22 is arranged to close the operating circuit of an electromagnetic shift mechanism in the following manner.

The loop 21a is arranged to support a weighted roller 26 which upon a predetermined downward movement closes a loop switch contact LS and completes a circuit for a shift control relay SC1, which effects the starting into operation of the shift mechanism comprising a feed ratchet 23 controlled by a feed magnet SR, and a stepping switch S having two rotary switches S1 and S2 and a stepping magnet SM controlled by magnet SR through the medium of two relays SC2 and SC3.

The record ribbon 21 beyond the loop 21a passes over a transfer plate or table 32 and is delivered by the step-by-step action of the ratchet mechanism 23 to a receiving drum 33.

The shift mechanism is so arranged that when started into operation by the energization of the relay SC1, the mechanism will shift the record strip 21 along the table 32 through a number of steps corresponding to a complete train description, viz., seven steps, as counted by the shift switch S, and will then cease to operate since the contact LS will be opened by the rise of the weighted roller 26.

Arranged above the plate or table 32 is a transfer magnet M having an energizing circuit closed by the energization of a transfer relay W3 when the stepping action of the shift switch S has been completed. Magnet M when thus energized is arranged to operate an armature 36 to move three transfer pins 37 into engagement with the record ribbon 21 which at this point lies immediately over three fixed contacts 38. The pins 37 are each connected to the positive terminal B of the source of current and it will be evident that when the pins 37 are thus moved downwards any one or more of the pins 37 which is opposite to a punched hole in the record ribbon 21 will supply current to the corresponding contact or contacts 38.

The receiving apparatus as shown in Figure 2 also includes three storage coders K3, K2, K1 each comprising three relays A, B, C, the energizing windings of the relays of the coder K3 being directly connected to the contacts 38. It will be thus seen that when the transfer magnet M is energized as above described one or more of the relays A3, B3, C3 is energized to store the train description in the coder K3.

From the above description it will be understood that in transmitting a train description the latter is first set up in the storage coder SC shown in Figure 1, and is then transmitted to the receiving apparatus through the line wires L1 and L2 by the action of the transmitter switch in taking seven steps from its second to its eighth contacts, the transmitter switch being stepped from its first to its second contacts by the action of the track relay. The transmitter switch is then arranged to step automatically to its first contacts again without effect upon the remainder of the apparatus.

It may also be arranged that the transmitter switch on arriving, for example, on its seventh contacts, operates a relay LT which, through its front contacts connects the front contacts 3 of the relays of the set-up coder SC to the windings of the relays AL, BL, CL of a "last description" coder LD so as to energize these relays to correspond with the energization of the relays energized in the coder SC. The coder LD is associated with an indicator comprising lamps 1EL to 6EL, inclusive, so as to exhibit an indication of the last train description transmitted, the train description stored in the coder LD being cancelled by the action of a relay 2TS which is automatically energized when the track relay 2TR releases to commence the transmission of the next train description.

The train description set up in the coder SC is arranged to be cancelled by the action of a reset relay RS which may be energized by the operation of a reset key RP by the operator before the transmitter switch starts stepping, but not after. When the transmitter arrives on its eighth contacts the relay RS is automatically energized so as to cancel the train description stored in the coder SC. It will be noted that the train description is not cancelled from the coder SC until after it has been transferred to the coder LD by the operation of the relay LT, the cancelling operation taking place on the eighth step of the transmitter switch and the transfer operation on the seventh step.

As already pointed out, at the receiving station the reception of the series of current impulses constituting the train description causes the record ribbon to be stepped forward and punched after which the transfer mechanism is operated to cause the train description recorded on the ribbon to be stored in the third storage coder K3 if the latter is unoccupied.

The occupancy of coder K3 causes a repeating relay X3 to be energized which by opening its back contacts deenergizes the transfer relay W3 and the transfer magnet M.

If the second coder K2 is unoccupied, a transfer relay W2 associated with that coder will be deenergized, and when relay X3 picks up energizing current is supplied to the relays of coder K2 over contacts 3 of such relays of coder K3 as have previously been energized as above described, so that the relays of the coder K2 corresponding to the energized relays of coder K3 are energized and the description is thus transferred to the coder K2. As soon as the description is thus stored in coder K2 a repeating relay X2 becomes energized and interrupts the stick circuits for the relays of coder K3, and when relay X3 releases the transfer relay W2 becomes energized, and the third coder is then ready to receive another train description. By a similar series of operations the description stored in coder K2 is transferred to coder K1 if the latter is unoccupied.

Each storage coder controls a series of indication lamps bearing the references 1E to 6E with distinguishing suffixes, so as to exhibit the train description stored in the coders.

As each train arrives at the receiving station the corresponding train description stored in the first storage coder is arranged to be cancelled by the energization of a cancelling relay CN when a train which has passed signal R4 vacates the track section 4T, whereupon the description stored in coder K2 is automatically transferred to coder K1, and that stored in coder K3 is then transferred to coder K2.

It should be noted that as above described the shift mechanism is prevented from operating so long as the third storage coder K3 of the series is occupied so that in these circumstances the record ribbon 21 containing the train descriptions recorded by the action of the punch magnet PM will pass into the loop 21a until the shift mechanism is started into operation by the train description in the storage coder K3 passing therefrom into the next coder K2 when the latter is free.

Although a series of three storage coders are shown in Fig. 3, it will be apparent that this number may be varied as required, in any particular case being equal to the number of descriptions that are required to be simultaneously indicated. In the embodiment illustrated, it will be apparent that the descriptions of the first, second and third approaching trains are exhibited at the receiving station, while the description of following trains which have passed the control station are stored in the tape until a storage coder is freed by the arrival of a train at the receiving station.

If track circuits are not available, or if for any reason their use for the control of the describers is not desired, the transmission and cancellation of descriptions may be effected manually by means of starting and cancelling keys or plungers. Furthermore, when track control of the describing apparatus is employed it is usual to provide emergency switches to permit manual starting and cancellation in the event of any failure of the track apparatus. Thus, in Fig. 1 an emergency switch 2EM is provided which when reversed renders a starting key 2EP operative to start transmission in place of track relay 2TR, while in Fig. 2, switch 4EM when reversed renders a cancelling key 4EP operative in place of track relay 4TR to cancel the description stored in coder K1.

Another feature of the invention relates to arrangements for the case in which a train, for any reason, leaves a transmitting station without a corresponding train description being set up and transmitted.

If a description is not set up, relay CH remains deenergized, and the apparatus is so arranged that if a train leaves the control station in these circumstances the release of the track relay 2TR effects the energization of a stick relay ND, to cause the operation of a bell NDB or other warning device, and of an indicator NDE exhibiting the indication "not described" and also to render operative the starting key 2EP to enable the omitted train description to be transmitted by hand and when this operation has been completed the warning device, the indicator and the starting key are rendered inoperative. The train description in question is thus caused to take its proper place in the series of train descriptions transmitted and is received, stored and exhibited at the receiving end in the normal manner.

In some cases it is desirable to provide arrangements for cancelling a train description already transmitted before the transmission of the next train description and this operation may be effected either automatically under the control of the transmitting operator or by cooperation between this operator and an operator at the receiving end. A special code signal similar in character to the train description signals is employed for cancelling purposes and is arranged to be set up in the set-up coder SC by operating an appropriate key CP, a relay CD and a cancelling check lamp CE becoming energized in this instance. Since the special code signal is not properly a train description and does not relate to a train movement, it is caused, when set up in the coder SC, to render operative the starting key 2EP in order that the signal may be transmitted manually.

The cancelling signal when received at the remote point is transmitted to the last storage coder K3 to energize the cancelling code relay CC, but unlike the train description signals does not pass into the next unoccupied storage coder but may be arranged to cancel the previously received train description which may at the time be stored in any storage coder of the series. This cancellation of the previous train description is arranged when effected also to cancel the stored cancelling signal.

The arrangement above described evidently enables the operator at the transmitting point to cancel the train description previously transmitted at his discretion. As herein illustrated, however, the cooperation of the operator at the receiving end is required for cancelling purposes, and it is arranged at the receiving end that the reception of the cancelling signal in the last storage coder K3 is caused to operate a warning device CLB and to render operative a key or plunger CLP which must be actuated by the receiving operator to energize relay CL1 or relays CL1 and CL2 to cause the stored cancelling signal and the train description previously received and stored in one of the storage coders to be both cancelled.

When track control is employed for the transmission and cancellation of descriptions it may be arranged that the track circuit control is only effective to govern the train describing apparatus when certain signals are at clear, as is illustrated in the drawings. In this way switching and reverse running moves to which train descriptions are not applied are prevented from affecting the apparatus. It may happen, however, that some trains may pass a station in the normal direction which do not move over the entire route from the control station to the receiving station and for which descriptions are not required. In such cases a special plunger SP and lamp SE may be provided as shown in Fig. 1. The operation of plunger SP energizes a stick relay SH, thereby lighting lamp SE and rendering the transmitter starting circuit ineffective. In this case when the train enters section 2T, relay 2TS is temporarily energized to release relay SH, restoring the apparatus to normal. It follows, therefore, that by the operation of key SP the track circuit control of the describing apparatus is rendered ineffective for one train movement only.

If desired, arrangements may be provided for printing or otherwise recording on the record ribbon or tape the date and time at which each corresponding train description is received. To this end a dating or time stamp 24 is mounted above the tape 21 in Fig. 2, this stamp being of the usual type comprising a series of type wheels driven by a clock mechanism with an inked ribbon interposed between the tape 21 and the type. When relay F or P is energized at the beginning of each code a circuit is completed from terminal B, front contact 2 of relay F or P, back contact 1 of a relay DR, through the winding of a print magnet DM to terminal C to energize magnet DM, thereby pressing tape 21 against the lower face of the type wheels to print the date and time thereon. When relay MC picks up to terminate the first impulse, relay DR picks up to release magnet DM. Relay DR is a slow release relay and since it is then energized repeatedly over its stick circuit including front contacts 2 of relays F and P or over front contact 4 of relay MC, it remains picked up until the code is completed.

I will now assume that a train description corresponding to plunger IP is to be transmitted from the control station of Fig. 1 to the terminal station of Fig. 2, and will trace the circuits in detail. The operation of plunger IP closes one partial circuit from its contact 1 over the back contact 1 and winding of relay AS to terminal C, and another partial circuit from its contact 2, over back contact 1 and winding of relay BS to terminal C. The plungers P are arranged so as to prevent improper operation in case the code selecting contacts 1, 2, 3 of the plungers are not uniformly adjusted or in case a plunger is not fully depressed, by connecting an additional contact 4 which has a slightly greater opening than any of the selecting contacts in series therewith. Normally contacts 4 of the plungers IP to 6P are positively energized over a connection to terminal B including back contact 3 of relay CH and contact 1 and arm t of switch T5. It follows that when the plunger contact 4 becomes closed due to a slight additional movement of the plunger beyond that required to close its selecting contacts, relays AS and BS are simultaneously energized, whereupon the stick circuits for these relays become closed from terminal B, back contact 1 of relay RS, front contacts 1 and windings of relays AS and BS to terminal C. When relays AS and BS pick up the connections to the selecting contacts of plunger IP are interrupted at the back contacts 1 of these relays, and a circuit is closed from terminal B, back contacts 1 of relay RS, front contacts 2 of relays AS and BS through relay CH to terminal C, so that relay CH picks up, opening its contact 3 to interrupt the connection to contact 4 of the plunger. All wires leading to the plungers IP to 6P are now deenergized, and the combination set up cannot be interfered with by any further operation of these plungers. The set-up may now be cancelled by operating the key RP to close the circuit from terminal B, arm t and contact 1 of switch T4, key RP, relay RS to terminal C, to energize relay RS to release the set-up coder relays. However, it will be assumed that the set-up is not cancelled in the present case. When relay CH picks up, the closing of its contact 4 connects terminal B to contact 4 of relay AS to complete a selected one of the check lamp circuits, each of which includes a contact 4, 5, 6, or 7, of each of the coder relays. These circuits are so arranged, as will be readily apparent from the drawings, that when one or more of the coder relays are energized in response to an operation of one of the plungers P that the lamp ES which corresponds to the operated plunger will become lighted. Thus, in the case described, a circuit will be completed over front contacts 4 of relays AS and BS, back contact 4 of relay CS, lamp IES to terminal C.

If, now, signal R2A or R2B has been cleared for the approaching train, the signal circuit controller 11 or 12 will be closed and when the train enters the track section 2T, track relay 2TR will release closing a circuit from terminal B, over its back contact 1, contact 11 or 12, normal contact n of switch 2EM, back contacts 3 of relays CD and ND, back contact 2 of relay 2TS, back contact 3 of relay SH, back contacts 2 of relay CD and ND, front contact 2 of relay CH, relay 2TP to terminal C. Relay 2TP picks up, whereupon a branch of its energizing circuit is closed which may be traced from back contact 3 of relay ND, which is now positively energized, over back contact 2 of relay SH, front contact 2 of relay 2TP, front contact 1 of relay CR, contact 1 and arm t of switch T1, back contact 1 and winding of the stepping magnet TM to terminal C. Magnet TM, upon becoming energized, opens its own circuit and in releasing, operates the ratchet mechanism 10 to advance arms t to contacts 2, thereby opening its energizing circuit at contact 1 of switch T1, the energy stored in the circuit due to the inductance of magnet TM being discharged through the condenser 17 and resistor 18. When relay 2TP became energized, another branch of its energizing circuit was completed from back contact 3 of relay ND, back contact 5 of relay SH, front contact 3 of relay 2TP, relay 2TS to terminal C, whereupon relay 2TS became energized to close its stick circuit including its front contact 2 and at its back contact 2 opening the circuit for relay 2TP. Relay 2TP is a slow release relay and after a short interval releases to open its contact 2 in the circuit leading to magnet TM. Relay 2TS remains energized as long as section 2T is occupied and then releases. During the interval when relays 2TP and 2TS are both picked up, the stick circuit for the relays of the last description coder LD are opened so that the train description stored therein is cancelled. This circuit may be traced from terminal B, back contacts 4 of relays 2TP and 2TS in multiple, front contacts 1 and windings of relays AL, BL and CL to terminal C.

The arms of switch T having arrived on step 2, a circuit is closed from terminal B, relay TC, back contact 4 of relay LR, arm t and contact 2 of switch T2 to terminal C. Relay TC picks up and completes a circuit from terminal B, contact 3 of relay AS, contact 2 and arm t of switch T3, front contact 4 of relay TC, relay RV to terminal C, whereupon relay RV picks up and reverses its pole-changing contacts 2 and 3. Relay TC also completes a circuit from terminal B, over its front contact 1, magnet TM to terminal C so that TM picks up whereupon relay LC becomes energized over the circuit from terminal B, front contacts 1 of relay TC, relay LC, contact 2 of relay TC, and resistor 16 to terminal C. Relay LC does not pick up until after TM picks up because while TM is released, relay LC is shunted by the branch circuit including back contact 1 of magnet TM and arm t and contact 2—3 of switch T1. Relay LC upon becoming energized closes its front contact 1 in the line circuit so that relay LR at the control station and relay P at the receiving station pick up in series. The opening of back contact 4 of relay LR releases relay TC and then relay LC and magnet TM release, operating the ratchet mechanism 10 to advance the arms of switch T to step 3. Relay RV is now held energized over its stick circuit including front contact 2 of relay LR.

When the receiving apparatus has fully responded as already described, relay MC opens the line circuit to release relay LR, whereupon relay TC picks up to energize relay RV over contact 3 of switch T3 and to again energize magnet TM and relay LC to pick up relay LR to transmit the second impulse, which will, therefore, be a positive impulse transmitted under the control of relay BS. Relays TC, LC and LR and magnet TM continue to operate in a similar manner but relay RV remains deenergized during the transmission of the third, fourth, fifth and sixth line impulses, and is then again energized to transmit the seventh or final impulse over a connection from terminal B to contact 8 of switch T3 so that the third, fourth, fifth and sixth line impulses are negative and the seventh is of positive polarity.

When the sixth line impulse is being transmitted, the switches T are on the 7th step, and a circuit is completed from terminal B, arm $t$, contact 7 of switch T5, relay LT to terminal C, relay LT picks up, closing its contacts 1, 2, and 3. Contacts 3 of relays AS and BS now being closed, the corresponding relays AL and BL of coder LD pick up, completing their stick circuits and also closing their front contacts 4 to complete a circuit for lighting the lamp 1EL.

When the seventh line impulse is being transmitted, the switches T are on step 8, and a circuit is completed from terminal B, arm $t$ and contact 8 of switch T4, through relay RS to terminal C, so that RS picks up, releasing relays AS, BS and CH and extinguishing lamp 1ES. Upon the termination of the seventh line impulse, switch T returns to normal, and the apparatus of Fig. 1 is then in condition to transmit a new description. During the transmission of the code, each time relay LR became energized, a circuit was completed over its front contact 3 to light the transmit lamp TE. Lamp TE thus repeats each impulse of the code and provides the operator with a visual indication of the operation of the transmitter.

Considering now Fig. 2, the code is recorded by the perforation of tape 21 as already described and when the tape advances sufficiently to close contact LS, a circuit is completed from terminal B, back contacts 1 of relays X3 and W3, switch LS, back contact 1 of relay SC2, relay SC1 to terminal C whereupon relay SC1 picks up completing a circuit over its front contact 1 to energize the shift ratchet magnet SR. The latter when energized completes a circuit from terminal B, front contact 1 of magnet SR, back contact 1 of relay SC3, relay SC2 to terminal C. Relay SC2 picks up, and a stick circuit for relay SC2 is now completed over switch LS and front contact 1 of relay SC2 to hold relay SC2 energized, and the opening of back contact 1 of relay SC2 causes relay SC1 to relase to deenergize magnet SR. Relay SC2 upon picking up also closes at its contact 4 the energizing circuit for stepping magnet SM which picks up. When magnet SR releases ratchet mechanism 23 is actuated to advance the tape one step and a circuit is closed from terminal B, through relay SC3, front contact 2 of relay SC2, back contact 2 of magnet SR to terminal C. Relay SC3 picks up and at its back contact 1 opens the energizing circuit for relay SC2 so that relay SC2 releases and in turn deenergizes magnet SM, thereby operating ratchet mechanism 25 of the shift switch to advance the arms of switches S1 and S2 to step 2. The release of relay SC2 again closes the circuit from terminal B over switch LS to relay SC1. However, relay SC1 will pick up even though switch LS opens, because a branch of this circuit extending from terminal B, arm $t$ and contact 2—6 of switch S2 to back contact 1 of relay SC2 is now closed to energize SC1. Relays SC1, SC2, and SC3 are slow release relays and continue to operate step by step to shift the tape 21 in the manner described until the 7th step is reached, whereupon a circuit is closed from terminal B, arm $t$ and contact 7 of switch S2, relay W3 to terminal C. Relay W3 then picks up, establishing its stick circuit leading to terminal B over back contact 1 of relay X3 and opens the connection from terminal B over the loop switch LS so that relays SC1 and SC2, and consequently magnets SR and SM, become released. The tape has now been advanced seven steps so that the perforations are in proper alignment with pins 37. Switch S has also been advanced seven steps to step 8, and a circuit is now closed from terminal B, front contact 3 of relay W3, arm $t$ and contact 8 of switch S1, back contact 1 and winding of magnet SM so that magnet SM picks up, opening its own circuit and releasing to advance switches S1 and S2 to normal. When relay SC3 releases, a circuit is completed from terminal B, front contact 2 of relay W3, back contacts 3 of relays SC3 and SC2, transfer magnet M to terminal C. Magnet M, therefore, picks up pressing pins 37 against the tape. Since the tape is perforated only on the first and second steps in addition to the seventh step, only the first two pins will make contact with the fixed contact members 38. Circuits will be completed, therefore, from terminal B, armature 36, pins 37, and contacts 38 and contacts 1 and windings of relays A3 and B3 to terminal C to pick up relays A3 and B3. The closing of front contacts 1 of these relays will complete their stick circuits which are energized from terminal B over back contact 4 of relay X2 and back contact 3 of relay CL1 and relay X3 will become energized over a circuit from terminal B, back contact 4 of relay X2, front contacts 2 of relays AS and BS in multiple, relay X3 to terminal C. Relay X3, upon picking up, opens its back contact 1 to release W3 and the latter relay in turn releases magnet M which when released, completes a circuit from terminal B, armature 36, back contact 39, back contact 4 of relay W2, front contact 3 of relay X3, back contact 3 of relay CC, front contact 3 of relay A3, contact 1 and winding of relay A2 to terminal C and also completes a similar circuit including front contact 3 of relay B3, contact 1 and winding of relay B2 so that relays A2 and B2 become energized. The closing of front contacts 1 of these relays completes their stick circuits which are energized from terminal B over back contacts 2 of relays X1 and CL2 and also completes branches of these stick circuits over front contacts 2 of relays A2 and B2 through relay X2 to terminal C so that relay X2 becomes energized. Relay X2 then picks up, and its back contact 4 opens to deenergize relays A3, B3 and X3. Relay X3 is a slow release relay and when it releases a circuit is completed from terminal B, front contact 4 of relay X2, back contact 2 of relay X3, relay W2 to terminal C, whereupon relay W2 picks up to complete its stick circuit over its own front contact 1 and closes its front contact 2 to provide a connection to terminal B for the stick circuits for the relays of coder K3 so that this coder is now in condition to receive a new description. The closing of front contact 3 of relay W2 completes a circuit which may be traced from terminal B, back contact 1 of relay CN, back contact 3 of relay W1, front contact 5 of relay X2, front contact 3 of relay W2, front contact 3 of relay A3, back contact 1 and winding of relay A1 to terminal C and also closes a similar circuit including front contact 3 of relay B2 and back contact 1 and winding of relay B1. Relays A1 and B1, therefore, pick up, completing their stick circuits which include only their front contacts 1 and back contact 1 of relay CN. Contacts 2 of these relays also close, completing the energizing circuit for relay X1 which picks up, opening at its back contact 2 the circuits for relays A2, B2 and X2 so that these relays release. Relay X2 is a slow release relay and when it releases a circuit is completed from terminal B, front contact 2 of relay X1, back contact 3 of relay X2, relay W1 to terminal C. Relay W1, therefore, picks up and completes its stick circuit including its own front contact 1 and closes its contact 2 to provide holding circuits for the relays of coder K2 which is now in condition to receive a new description. The train description corresponding to plunger IP is now stored in coder K1 and is displayed by the energization of lamp IE1 over a circuit which may be traced from terminal B, front contacts 4 of relays A1 and B1, back contact 4 of relay C1 to terminal C. If the description of a following train now becomes stored in coder K2, one of the lamps IE2 to 6E2 becomes lighted over a circuit completed to terminal B at contact 4 of relay A2, and to terminal C at front contact 1 of relay X1. Similarly, if the second coder K2 is occupied, the description of a third train may be stored in coder K3 and will be exhibited as a result of the closing of one of the lamp circuits which are completed to terminal B at contact 4 of relay A3, and to terminal C at front contact 1 of relay X2. It is to be noted that the lamp circuits for coders K2 and K3 are not closed unless the next coder in advance is occupied, the circuits being arranged in this manner in order to prevent a momentary flashing of these lamps when a description is received in coder K3 which is immediately transferred to coder K2 or K1.

It will now be assumed that the train first described arrives at the terminal station and enters track section 4T with signal R4 at clear. The release of the track relay 4TR completes a circuit from terminal B over its back contact 1, a circuit controller 16, closed when signal R4 is at clear, contact n1 of emergency switch 4EM, relay 4TP to terminal C. Relay 4TP picks up and completes a stick circuit which includes back contact 1 of relay 4TR, contact n2 of switch 4EM and its own front contact 1 and winding so that relay 4TP remains energized as long as section 4T is occupied. Relay 1TP by closing its front contact 2 effects the energization of relay CN and by closing its front contact 3 bridges back contact 1 of relay CN to prevent deenergization of the relays of coder K1 until the train vacates section 4T. When this occurs, relay 4TP releases, opening its contact 3 to deenergize relays A1, B1 and X1, to thereby cancel the description stored in coder K1. Relay CN is a slow release relay and when its back contact 1 closes, the coder K1 is again in condition to receive a train description.

Returning to Fig. 1, I will next assume that a train enters section 2T, with signal R2A or R2B at clear but that the operator has failed to set up the description in coder SC. The closing of back contact 1 of relay 2TR will in this case complete a circuit over back contact 2 of relay CH to energize relay ND instead of over front contact 2 of relay SH to energize relay 2TP, as previously described, and relay ND will pick up and complete a stick circuit over its contact 1 comprising a branch of the stick circuits of the relays of the LD coder and at its back contacts 2 and 3 will open its own pickup circuit, and further, relay ND by closing its front contact 4 will energize the "no description" lamp NDE and the associated bell NDB. If the description is now set up by the operation of the appropriate plunger P, relay CH will become energized and a circuit will be made available for starting transmission which may be traced from terminal B, emergency plunger 2EP, front contact 2 of relay ND, relay 2TP, to terminal C, and upon the energization of relay 2TP, a circuit will be closed from terminal B, front contact 3 of relay ND, back contact 2 of relay SH, front contact 2 of relay 2TP and front contact 1 of relay CR to energize magnet TM as already described, and likewise relay 2TS will be picked up over a circuit from terminal B, front contact 3 of relay ND, back contact 5 of relay SH, front contact 3 of relay 2TP, relay 2TS to terminal C and will then be held energized over its own front contact 2 and will cause relay 2TP to become deenergized as previously described.

In the event the operator for any reason wishes to cancel at the receiving station the last description transmitted, he will operate the cancelling plunger CP, energizing relays AS, BS, CS and CH, thereby lighting lamp CE and energizing relay CD in multiple therewith. Contacts 2 and 3 of relays CD function in the same manner as the corresponding contacts of relay ND and the operator may start the transmission when relay CD is energized by the operation of key EP in the manner already described in connection with relay ND.

At the receiving station, the code will be recorded in the tape and in due course will arrive in storage coder K3. Relays A3, B3, C3 will become energized, completing circuits over their front contacts 4 to light lamp 1CE and to pick up relay CC. The opening of back contact 3 of relay CC prevents the transfer of the cancelling code to the next storage coder K2 if this is free, and since the reception of descriptions is now blocked, it is desirable to secure the immediate cooperation of the receiving operator. This is accomplished by energizing the buzzer CLB over front contact 1 of relay CC. In response to the signals given by the buzzer CLB and lamp 1CE, the receiving operator will operate the plunger CLP to pick up the cancelling relay CL1 which is a stick repeater of relay CC. If coder K1 is occupied by the last previously transmitted description, coder K2 will be free and relay X2 will be deenergized, and a circuit will be closed from terminal B, front contact 4 of relay CL1, back contact 3 of relay CL2, back contact 6 of relay X2, relay CN to terminal C, so that relay CN will pick up and open its back contact 1 to cancel the description stored in coder K1. If, however, the description in question occupies coder K2 relay X2 will be energized in which case a circuit will be completed from terminal B, front contact 2 of relay X2, relay CL2, front contact 2 of relay CL1 to terminal C to pick up the cancelling relay CL2 to cancel the description stored in K2 by opening back contact 2 of relay CL2 in the stick circuits for relays A2, B2, C2. In either case, the cancelling code occupying coder K3 will also be cancelled by the opening of back contact 3 of relay CL1 in the stick circuits for relays A3, B3, C3, and the cancelling relays will then be released.

Referring again to Fig. 1, it will be assumed that the operator wishes to pass an undescribed train through section 2T, and that he accordingly operates the special plunger SP. This results in completing a circuit for lamp SE and also for relay SH which relay will pick up and establish a stick circuit including its own contact 1 and back contact 1 of relay 2TP, as is obvious from the drawings. If relay 2TR now releases due to the occupancy of section 2T by the train in question, a circuit is completed from terminal B, over back contact 1 of relay 2TR, contact 11 or 12, contact n of switch 2EM, back contacts 3 of relays ND and CD, back contact 2 of relay 2TS, front contact 3 of relay SH, relay 2TS to terminal C. Relay 2TS picks up and establishes its own stick circuit over its contact 2 and completes a circuit for relay 2TP which is a branch of the circuit just traced including front contacts 5 of relays SH and 2TS. Relay 2TP picks up, but front contact 1 of relay 2TS now being closed, relay SH does not release. Front contact 4 of relay SH being closed, the holding circuits for the relays of coder LD are not opened, while the circuit for magnet TM is held open at back contact 2 of relay SH. When the train vacates section 2T, relays 2TS, SH, and 2TP release in sequence in that order. It follows that in this case the transmitting apparatus is not operated, and that the apparatus is restored to normal as soon as one train passes through section 2T.

The arrangements above described involving the utilization of a record ribbon or strip have the advantage of ensuring an actual permanent record of the train descriptions involved but in some cases this may be unnecessary. In the second form of the invention as illustrated in Fig. 3, the code signals constituting the train descriptions transmitted to the line wires are at the receiving end arranged to effect directly the operation of the series of storage coders so that the train descriptions are temporarily stored in these coders through which they pass in succession as above described, being exhibited in turn, as they enter the first one or more of the storage coders. In this form of the invention the feed and shift mechanism for the ribbon at the receiving station is omitted and the last storage coder such as K3 comprises three or more relays as in Fig. 2, which relays are connected one at a time in turn to a contact 2 of the positive impulse relay P by the operation of a stepping switch R or the like which operates through one step each time that either relay F or relay P is energized by an impulse received over line wires L1 and L2 from the control station. Each relay of coder K3 is energized or not according to whether the impulse received at the time the relay is connected is received by relay P or relay F, and the code descriptions are thus stored in the coder K3 and passed on to the coders K2 and K1 as already described provided that these coders are unoccupied.

It will be understood that in this arrangement in which a record ribbon is not employed, the number of storage coders provided must be equal to the maximum number of train descriptions to be stored. When the last coder K3 is occupied, relay MC is arranged to become steadily energized and interrupts at its back contact 3 the circuit for relays F and P, so as to prevent under these conditions the reception of code signals by these relays. When the line circuit is held open an indication of this condition may be given at the control station by the provision of an indicator responsive to the deenergization of relay CR.

Referring to Fig. 3, it will be seen that the circuits for relays F, P, MC and MR are similar to those of Fig. 2 except that a stepping magnet RM has replaced the feed magnet FM and controls the line transmission in a similar manner. The circuits for interconnecting the several storage coders have been omitted because these correspond to those of Fig. 2 as already described. The repeating relay X3 is replaced by a stick relay XS3 and a check relay CK has been added having a circuit comprising a branch of the energizing circuit for the relays of coder K3 which includes a back contact 4 of relay XS3, so that relay CK will be energized as long as coder K3 is free and available for the storage of a train description.

If relay CK is deenergized, switch R will be stepped automatically to position 1, as shown, by the closing of an "off normal" circuit which may be traced from terminal B, back contact 2 of relay CK, contact 2—8 and arm t of switch R1, back contact 3 and winding of magnet RM to terminal C, and the line will be held open due to the energization of relay MC over back contact 1 of relay CK. When storage coder K3 becomes available, relay CK will become energized over back contacts 4 of relays X2 and XS3, thus releasing MC to close the line circuit with switch R on step 1.

Assuming that the train description corresponding to plunger 1P is now transmitted from the control station, the reception of the first impulse, which is positive, by the apparatus of Fig. 3 will cause relay P to be energized, completing a circuit from terminal B, contact 2 of relay P, arm t and contact 1 of switch R2, contact 1 and winding of relay A3 to terminal C, while at the same time a circuit will be completed over contact 1 of relay P to energize the stepping magnet RM to close its contact 1 to energize relay MC to terminate the impulse. When relay P releases, magnet RM will release to advance switch R to step 2, and then relay MR will pick up to release relay MC. The second impulse which is also positive will be similarly received over contact 2 of switch R2 to energize relay B3. The third to sixth impulses, inclusive, being negative, relay F, magnet RM and relays MC and MR will be operated but relay P will remain deenergized. The 7th line impulse being positive, a circuit will be completed when switch R2 is on the 7th step from terminal B, contact 2 of relay P, arm t and contact 7 of switch R2, relay XS3 to terminal C, so that relay XS3 will pick up, completing its stick circuit over its own contact 1 and contacts 2 of relays A3 and B3, and will open its contact 4, thereby releasing relay CK to hold the line open. When P releases, switch R will be advanced to normal, while the closing of contact 3 of relay XS3 will permit the description to be transferred to coder K2 if this is free, in which case the energizing circuits for relays A2, B2 and X2 are positively energized at back contact 4 of relay W2. Relay X2 upon becoming energized opens its back contact 4 to deenergize relays A3, B3 and XS3, and relay W2 then becomes energized as hereinbefore described in connection with Fig. 2, and the closing of front contact 2 of relay W2 reenergizes relay CK to restore the apparatus of Fig. 3 to the condition shown in the drawings.

In view of the foregoing, it is clear that the direct-connected type of receiver, such as is illustrated in Fig. 3, may be substituted for the ribbon storage type in any of the various modifications or arrangements of the apparatus herein shown or described.

The receiving and storage apparatus of either of the two forms shown in Figs. 2 and 3 may be utilized not only at a terminal station as indicated in Fig. 2, but may also be utilized at an intermediate station for the immediate retransmission of the train description therein contained to a still more remote station along the line, the passage of the description from coder K3 to coder K2 being suspended till such transmission has taken place.

For this purpose the storage coder K3 may be utilized to take the place of the set-up coder SC of Fig. 1. This modification of the apparatus is shown in Fig. 4, in which the wires leading from the contacts 3 of a storage coder K3 similar to that shown in Fig. 2 are arranged to be connected through back contacts 1, 2, 3 of a transfer relay TF when the latter is deenergized to the contacts of a rotary switch T3 of a retransmitting mechanism RT similar to the transmitting mechanism T shown in Fig. 1, whereby the train descriptions are transmitted as a series of impulses to line wires L1A and L2A leading to the more remote station at which receiving apparatus similar to that shown in Figs. 2 or 3 is provided.

In the modification illustrated in Fig. 4, it is arranged that the transmitting mechanism RT steps from contact 1 to contact 2 when storage coder K3 becomes occupied with a description and the transfer magnet M releases and then steps from contact 2 to contact 8 while transmitting the description.

When the transmission is completed a stick relay S3 becomes energized and remains energized through its own front contact and contact 3 of relay X3 as long as storage coder K3 remains occupied with the description. If the second storage coder K2 is unoccupied, in which case relay W2 will be deenergized as hereinbefore described, the energization of relay S3 completes a circuit over its front contact 2 to energize relay TF, and the energization of relay TF permits the train description stored in coder K3 to pass to coder K2. This results in the deenergization of coder K3 and consequently of relays X3, S3 and TF.

Considering the circuits of Fig. 4 in detail, it is to be understood that the code description is delivered to coder K3 as a result of the energization of the transfer magnet M and then relay X3 picks up to release relay W3 and magnet M as already described. The release of magnet M completes a circuit from terminal B, armature 36, contact 39, front contact 3 of relay X3, back contact 1 of relay S3, front contact 1 of the line detector relay CR, contact 1 and arm t of switch T1, back contact 1 and winding of the stepping magnet TM to terminal C. The arms of the retransmitting switch RT then advance to step 2 and relay TC becomes energized, and assuming relay A3 to be energized, a pickup circuit for relay RV is closed from terminal B, front contact 3 of relay A3, back contact 3 of relay TF, contact 2 and arm t of which T3, contact 4 of relay TC, relay RV to terminal C, so that relay RV will be energized and the first impulse retransmitted will be of positive polarity to effect the energization of a relay A3 at the more remote station. As is apparent from the drawings, mechanism RT will operate in the same manner as mechanism T already described to step 8, and then the energizing circuit for relay S3 is completed from terminal B over arm t and contact 8 of switch T4. Relay S3 will, therefore, pick up and remain energized as already pointed out, and mechanism RT will return to normal. If a cancelling code occupies coder K3 and relay CC is energized, the buzzer CLB now becomes energized over front contact 1 of relay CC, and the cancelling code and also the description occupying coder K2 or K1 may be cancelled by the operation of key CLP as hereinbefore explained, but if relay CC and also relay W2 are deenergized, a circuit is now closed from terminal B, front contact 2 of relay S3, back contact 4 of relay W2, back contact 3 of relay CC, relay TF to terminal C, so that relay TF becomes energized to complete the energizing circuits for the relays of coder K2 over its front contacts 1, 2 and 3. Relay X2 then picks up, releasing the relays of coder K3 and then relays X3, S3 and TF release in order.

It will be readily apparent that with the arrangement of Fig. 4 the same series of descriptions will be exhibited at the more remote station and at the intermediate station, and that these may be cancelled in the usual manner as the trains arrive at the respective stations, each description being delivered to the more remote station before the next description is received at the intermediate station.

Any of the remote stations to which train descriptions may be transmitted or retransmitted may be provided with arrangements for interposing other train descriptions than those received from the transmitting station in the series of train descriptions exhibited or retransmitted.

Fig. 5 illustrates apparatus at a remote point for retransmitting a received train description to a still more remote point and provided with interposing arrangements in accordance with a feature of the invention.

In the retransmitting arrangements hereinbefore described in connection with Fig. 4, the train description received and stored in the third storage coder K3 is arranged to be retransmitted by the transmitter mechanism RT to line wires L1A and L2A as soon as it is received. In the apparatus of Fig. 5, on the other hand, the train description which is to be retransmitted is stored in the first of a series of storage coders such as K1 and is transmitted upon the arrival of the train at the intermediate station.

It is to be understood that the apparatus of Fig. 5 is located at an intermediate station along the track which is also provided with receiving and storing apparatus similar to that of Fig. 2 or Fig. 3 for exhibiting train descriptions which have been transmitted from a control station such as that of Fig. 1 situated at the left of Fig. 5, and that these descriptions together with others such for example as those of trains which enter the main track by passing signal R7 are to be transmitted over line wires L1A and L2A to a more remote station situated at the right of Fig. 5.

For retransmitting the received descriptions contacts 3 of the relays of the first storage coder K1 of Fig. 5 are arranged to be connected to the contacts of a retransmitting mechanism RT similar to mechanism T of Fig. 1, through the front contacts of a delivery relay 6D, so that when relay 6D is energized the storage coder K1 will serve in place of the set-up coder SC shown in Fig. 1.

If a description of a train approaching signal R6 is stored in the coder K1 and the train passes this signal at clear and occupies section 6T, track relay 6TR will release to complete a circuit from terminal B, circuit controller 27, contact n of switch 6EM, back contact 1 of relay 6TS, relay 6TP to terminal C, so that relay 6TP will pick up, closing its contact 1 to energize relay 6TS. Relay 6TS then picks up to complete its stick circuit and remains energized until signal R6 is put to stop or section 6T is vacated, and releases relay 6TP. Relay 6TP is a slow release relay and remains energized for a brief interval so that a circuit is closed momentarily from terminal B, arm t and contact 1 of switch T5, back contact 3 of relay CH, front contact 3 of relay 6TP, relay 6D to terminal C. Relay 6D picks up and then is held energized over its front contact 1 until the relays of coder K1 are released, and by closing its contacts 3, 4, 5 establishes connections from contacts 3 of the coder relays to the contacts of switch T3 for the control of the transmitter relay RV. Relay 6TP also closes its front contact 2 to complete a circuit over front contact 1 of relay CR to energize the stepping magnet TM of the retransmitting mechanism RT, and opens its back contact 2 to release the relays of coder LD to cancel the description last transmitted and stored therein. The transmitting operations are similar to those already described in connection with Fig. 1, and the description of these will not be repeated, further than to point out that on the 7th step a circuit is closed over contact 7 of switch T5 to pick up relay LT, whereupon the description stored in coder K1 is transferred to coder LD, and on the 8th step a circuit is closed from terminal B, arm t and contact 8 of switch T4, front contact 2 of relay 6D, relay CN to terminal C. Relay CN then picks up to cancel the description stored in coder K1 and to release relay 6D.

The set-up coder SC in Fig. 5 is associated with keys or plungers such as 1P as in Fig. 1 by means of which a train description to be interposed is set up, the operation of any of these keys or plungers being arranged to effect the energization of the relay CH, as hereinbefore described.

If a train description has been set up in coder SC and a train passes signal R7 at clear, track relay 7TR will release to complete a circuit from terminal B, circuit controller 28, contact n of switch 7EM, back contact 1 of relay 7TS, back contacts 3 of relays ND and CD, front contact 2 of relay CH, relay 7TP to terminal C, whereupon relay 7TP picks up to close a circuit from terminal B, arm t and contact 1 of switch T5, front contacts 3 of relays CH and 7TP, relay 7D to terminal C. The closing of front contact 2 of relay 7TP completes the circuit to energize magnet TM to start the transmission, and the opening of back contact 2 releases the relays of coder LD, as before. The energization of relay 7D completes its stick circuit including back contact 1 of relay RS, and the closing of its contacts 3, 4, 5 establishes connections from contacts 3 of the relays of the set-up coder SC to the contacts of switch T3 for the control of the transmitter relay RV. Relay LT is operated, as before, so that the description stored in coder SC is transferred to coder LD on the 7th step, coder SC and relay 7D being released by the operation of relay RS on the 8th step. In the apparatus of Fig. 5, relay ND operates in case a description of a train passing signal R7 has not been set up, and CD operates in response to an operation of the cancelling key CP as already described in connection with Fig. 1.

The apparatus of Fig. 5 is also so arranged that when relay 6D is energized and a description stored in coder K1 is being transmitted, the set-up coder SC and relay CH are non-operative, the circuits which include the contacts of the plungers such as 1P being open at contact 1 of switch T5. It is further to be understood that the signal circuits are to be arranged in the usual manner so that signals R6 and R7 cannot be cleared at the same time.

It will also be readily apparent from the drawings that additional storage coders such as K1 receiving descriptions from other control points may be added to the apparatus of Fig. 5 and that this apparatus may then be utilized to receive descriptions from a plurality of control stations situated at different points of origin of trains which are to pass over converging routes and that these descriptions will be transmitted in the proper order to a terminal station at which the trains are to arrive over the same track, and that my apparatus may be readily adapted to a wide variety of different track layouts such as are encountered in practice.

In this connection it is to be noted that it may happen that some of the trains of which descriptions are received from the control station or stations terminate their runs or are diverted to a branch line at the intermediate station or at some other point, and it will be evident that when these trains leave the main line, their descriptions should be cancelled and that only those descriptions which correspond to trains which are to continue to the terminal station should be retransmitted.

Fig. 6 illustrates a modification of the arrangements of Fig. 5 whereby one or more of the received descriptions may be selectively cancelled in accordance with a feature of the invention.

It is to be understood that in Fig. 6 that the three storage coders K3, K2, K1 correspond to those of Fig. 2 or 3 and are utilized to receive descriptions from a point of control situated at the left of Fig. 6, but that the descriptions of only those trains which pass section 8T are to be retransmitted, the description of those trains which leave the main line under the control of signal R5B being exhibittd at the intermediate station only as long as these trains occupy the main line. To simplify the drawings, the retransmitting apparatus has been omitted from Fig. 6 and 8TP illustrated as controlling the cancelling relay CN1 directly instead of through the medium of retransmitting apparatus, as in the case of the corresponding relay 6TP of Fig. 5. It will also be assumed for simplicity that only the description corresponding to plunger 6P of Fig. 1 applies to trains which pass signal R5B at clear and leave the main line, and that the others such as the one corresponding to plunger 1P apply to trains which are to pass signals R5A and R8 at clear. It will be apparent from the drawings that any train upon passing signal R8 will cause relay CN1 to be momentarily energized to cancel the description stored in coder K1 and that the coders function with respect to such trains in the same manner as in the several modifications already described.

If now a train passes signal R5B at clear, the release of track relay 5TR will cause relay 5TS to pick up, and then relay 5TP will pick up, the circuit arrangements being similar to those already described in connection with relays 4TP and CN of Fig. 2. When the train vacates section 5T, a circuit will be closed momentarily from terminal B over back contact 2 of relay 5TS and front contact 1 of relay 5TP to contact 8 of relay C1 so that this contact will become positively energized.

The circuit including contacts 8 of relays A1, B1, C1 comprises a network having two branches, one of which is closed through relay CN1 to terminal C only when a branch line description is stored in coder K1, the other being closed to energize a similar network associated with the next storage coder K2 only when a main line train description is stored in coder K1. This circuit may be arranged in different ways to cancel one or more descriptions under either condition as required; but for simplicity, it is illustrated as applying to one description only. It will be readily apparent from the drawings that if the code stored in coder K3 is such that lamp 6E1 is lighted, a circuit corresponding to that for the lamp will be completed over contacts 8 so that relay CN1 will be operated to cancel the description stored in coder K1, but that the cancelling impulse will be transmitted through coder K1 to coder K2 to positively energize contact 8 of relay C2 if a different lamp such as 1E1 is lighted. In the latter case, the impulse will have a similar effect upon the next coder.

Thus, it may be assumed that a main line train having its description stored in coder K1 is occupying the stretch between sections 5T and 8T when a following branch line train having its description stored in coder K2 enters section 5T. Lamps 1E1 and 6E2 will be lighted in this case, and when contact 8 of relay C2 is positively energized, one branch of the network including contacts 8 of relays A2, B2, C2 will be completed through an auxiliary cancelling relay CN2 to terminal C, so that relay CN2 will pick up momentarily to open its back contacts 1 and 2 to cancel the description stored in coder K2.

On the other hand, if there are two main line trains between sections 5T and 8T of which descriptions are stored in coders K1 and K2 and the description of the branch line train is stored in coder K3, lamp 6E3 will be lighted in coder K3 while in coders K1 and K2 lamps such as 1E1 and 1E2 will be lighted. In this case the impulse will be transmitted through coders K1 and K2 to positively energize contact 8 of relay C3 of the third coder, and the cancelling circuit will be completed over contacts 8 of relays A3, B3, C3 so that a cancelling relay CN3 will be operated to open its contact 1 to extinguish lamp 6E3. If main line train descriptions are stored in all three coders, it will be apparent that no branch of the cancelling circuit will be closed by an operation of relays 5TS and 5TP.

It will be further apparent that each cancelling impulse is effective to cancel one description only; for example, if lamps 6E1 and 6E2 are lighted to exhibit the descriptions of two successive branch line trains, lamp 6E1 will be extinguished as a result of the operation above described when the first train leaves the main line, and then when relays CN1 and X1 have released, the description stored in coder K2 will be transferred to K1 so that lamp 6E1 will again become lighted to exhibit the description of the second train, lamp 6E2 becoming extinguished when coder K2 is released and thereby rendered available to exhibit the description of a third train. The arrangements of Fig. 6 may be applied to any of the modifications of the apparatus situated at an intermediate or terminal station.

My invention also includes arrangements for transmitting train descriptions corresponding to the trains of a normal or standard schedule by providing a ribbon or record strip of paper or preferably of more durable material in which these train descriptions are punched as a permanent record.

This ribbon or strip is arranged to be fed through apparatus at the control station similar to that shown in Fig. 2 comprising feed mechanism operated or controlled by the trains leaving the station together with a transfer pin device or its equivalent whereby the train descriptions are successively transferred to a set-up coder corresponding to the last storage coder K1 of the receiving apparatus previously described. This set-up coder is arranged to effect the transmission of the train descriptions to the line conductors L1 and L2 and thus replaces the set-up coder SC controlled by the manually operated keys or plungers. In order to allow for special variations of the train schedule, interposing arrangements such as are shown in Fig. 5 may be provided for interpolating any additional train descriptions required in the manner above explained.

Although I have herein shown and described only a few modifications of the apparatus embodying my invention, it is understood that various other changes and modifications may be made therein within the scope of the appended claims without departing from the spirit and scope of my invention.

Having thus described my invention, what I claim is:

1. Train describing apparatus comprising a line circuit extending from a first station to a second station, means at said first station for repeatedly energizing said line circuit, each successive energization of said line circuit constituting an element of a code signal corresponding to the description of a particular train; recording means at the second station for recording each code element, and means at said second station for momentarily opening said line circuit as each code element is recorded to terminate such element and to render said line circuit available for the transmission of the next succeeding code element.

2. Train describing apparatus comprising means for transmitting code signals each characteristic of a particular train description from a first station to a second station, a plurality of indicators at said second station controlled by said code signals for indicating the descriptions of a plurality of trains until cancelled, and means interposed between said line circuit and said indicators for recording each code signal in a perforated tape or ribbon to store the train descriptions last received when the number of descriptions transmitted is greater than the number of available indicators.

3. Train describing apparatus comprising means for transmitting code signals each characteristic of a particular train description from a first station to a second station, recording means at said second station for recording each code signal as received in the form of a group of perforations in a paper tape or ribbon, an indicator at said second station selectively operable to indicate any one of said train descriptions, and means controlled by said recording means for repeatedly operating said indicator in accordance with the arrangement of the perforations in successive groups of perforation in said tape or ribbon to indicate the descriptions of successively arriving trains.

4. Remote control apparatus comprising a control station and a receiving station connected by a single line circuit, transmitting apparatus at the control station for delivering multiple element code signals which include selected elements of distinctive character to said line circuit, code responsive apparatus at the receiving station for receiving the code signals from said line circuit including stepping means operated one step for each element received and registering means selectively responsive to each element of distinctive character received, and means controlled by said stepping and registering means for controlling said transmitting apparatus so that each successive element can be transmitted only after the preceding element has been fully registered.

5. Remote control apparatus comprising a control station and a receiving station connected by a signal line circuit, transmitting apparatus at the control station for delivering multiple element code signals which include selected elements of distinctive character to said line circuit, code responsive apparatus at the receiving station for receiving the code signals from said line circuit including stepping means for advancing a paper tape or ribbon one step for each element received and to punch holes therein at corresponding positions as the elements of distinctive character are received, and means controlled by the apparatus at the receiving station for controlling said transmitting apparatus so that each successive element can be transmitted only after the preceding element has been fully recorded.

6. Code transmitting apparatus for delivering multiple element code signals which include selected elements of distinctive character to a line circuit, comprising a series of manually operable keys one for each code to be transmitted, a series of relays each allotted to a particular element of a code, means for distinctively energizing selected ones of said relays when any key is operated, checking means controlled by said relays for visually indicating which key has been operated, stepping apparatus effective when operated to deliver a series of code elements to said line circuit including an element for each relay of the series each such element being of distinctive character only when the corresponding relay is energized, and means independent of said keys but rendered operable when said checking means is operated for initiating the operation of said stepping means.

7. Remote control apparatus comprising a control station and a receiving station connected by a single line circuit, transmitting apparatus at the control station for delivering multiple element code signals which include selected elements of distinctive character to said line circuit, code responsive apparatus at the receiving station for receiving the code signals from said line circuit including stepping means operated one step for each element received, a series of storage coders each comprising a number of relays each of which is allotted to a particular element of a code, means controlled by said stepping apparatus for energizing only those relays of the last storage coder of the series which correspond to elements of distinctive character in the code, means controlled by each coder relay when energized for energizing the corresponding relay of the next preceding storage coder provided all the relays of such coder are released, means independent of said apparatus for at times releasing the relays of the first coder of the series, a visual indicator controlled by each storage coder including a lamp for each different code, means controlled by the relays of the first storage coder to selectively energize a particular one of the lamps controlled thereby in accordance with the energization of the relays of said first storage coder, and means controlled by the relays of each remaining storage coder to selectively energize a particular one of the lamps controlled thereby in accordance with the energization of the relays of such coder provided the next preceding coder of the series is occupied.

8. Remote control apparatus comprising a control station and a receiving station connected by a single line circuit, transmitting apparatus at the control station for delivering multiple element code signals which include selected elements of distinctive character to said line circuit, code responsive apparatus at the receiving station for receiving the code signals from said line circuit including stepping means for advancing a paper tape or ribbon one step for each element received and to punch holes therein at corresponding positions as the elements of distinctive character are received, a storage coder comprising a series of relays including one corresponding to each element of a code, means effective when a code is fully received for energizing only those relays of said storage coder which correspond to the code elements for which holes have been punched in the tape, a visual indicator controlled by said storage coder including a lamp for each different code, and means controlled by the relays of said storage coder to selectively energize a particular one of said lamps in accordance with the energization of said relays.

9. Code transmitting apparatus for delivering multiple element code signals to a line circuit, comprising a series of manually operable code keys, one for each code to be transmitted, a set-up coder controlled by said keys for setting up and storing any one of said codes until cancelled, stepping apparatus effective when set into operation to deliver the code stored in said set-up coder to said line circuit and to then cancel the stored code, a railway track circuit, and directionally controlled means rendered effective when a train enters said track circuit in a particular direction to set said stepping apparatus into operation.

10. Code transmitting apparatus for delivering multiple element code signals to a line circuit, comprising a series of manually operable code keys, one for each code to be transmitted, a set-up coder controlled by said keys for setting up and storing any one of said codes until cancelled, stepping apparatus effective when set into operation to deliver the code stored in said set-up coder to said line circuit and to then cancel the stored code, a railway track circuit, means rendered effective when a train occupies said track circuit to set said stepping apparatus into operation provided the set-up coder is occupied by a code, a manually operable starting key, and means rendered effective if a train enters said track circuit when the set-up coder is not occupied by a code to render said starting key operable to set said stepping apparatus into operation to transmit any code stored by a subsequent operation of one of said code keys.

11. Code transmitting apparatus for delivering multiple element code signals to a line circuit, comprising a series of manually operable code keys, one for each code to be transmitted, a set-up coder controlled by said keys for setting up and storing any one of said codes until cancelled, stepping apparatus effective when set into operation to deliver the code stored in said set-up coder to said line circuit and to then cancel the stored code, a railway track circuit, means rendered effective when a train occupies said track circuit to set said stepping apparatus into operation, a special key, and means rendered effective when said special key is operated to permit one train only to pass over said track circuit without causing an operation of said stepping apparatus.

12. Code transmitting apparatus for delivering multiple element code signals which include selected elements of distinctive character to a line circuit, comprising a series of manually operable keys one for each code to be transmitted, a series of relays each allotted to a particular element of a code, means for distinctively energizing selected ones of said relays when any key is operated, checking means controlled by said relays for visually indicating that a key has been operated, stepping apparatus effective when operated to deliver a series of code elements to said line circuit including an element for each relay of the series each such element being of distinctive character only when the corresponding relay is energized, and means independent of said keys but rendered operable when said checking means is operated for initiating the operating of said stepping means.

13. In a remote control system, a series of storage coders at a receiving station, each storage coder comprising a plurality of relays, means for energizing selected relays of the last storage coder of said series in different combinations, means effective when selected relays of the last storage coder of the series are energized and all the relays of one or more of the preceding storage coders of the series are deenergized for successively energizing corresponding relays in each preceding storage coder in turn until a storage coder is reached in which such relays are held energized until the relays of the next preceding storage coder become deenergized, means for releasing the relays of each storage coder when corresponding relays of the next preceding storage coder become energized, cancelling means for releasing the relays of the first storage coder of the series, means effective when a particular combination of the relays of the last storage coder becomes energized to hold such relays energized without operation of the relays of any preceding storage coder, and auxiliary cancelling means governed by said particular combination of energized relays for releasing both the relays of the last storage coder and of the last preceding storage coder in which relays are energized.

14. In a remote control system, a control station and a receiving station connected by a line circuit, two similar series of stick relays, one series being at each station, means effective only when all the stick relays at the control station are deenergized for energizing one or more to form a combination of relays, stepping means rendered effective when any stick relay at the control station is energized but only if all the stick relays of the receiving station series are deenergized for delivering a series of impulses including one for each relay of the control station series to said line circuit, means controlled by each energized relay for modifying the corresponding impulse of said series of impulses, means for energizing only those stick relays of the receiving station series corresponding to the modified impulses in said series of impulses, and other means for releasing said energized stick relays of the receiving station series.

15. In combination with a control station and a receiving station at spaced points along a stretch of railway track, a single line circuit connecting said stations, a series of stick relays at each station, means for energizing one or more of the control station stick relays to form a combination of relays, stepping apparatus effective when initiated for delivering a series of impulses including one for each relay of the control station series to said line circuit, means controlled by each energized control station relay for modifying the corresponding impulse of said series of impulses, means governed by said impulses for energizing a selected one or more of the receiving station series of relays, each energized relay corresponding to a modified impulse in said series of impulses, a series of indication lamps at the receiving station including one for each combination of relays, means rendered effective at the end of a series of impulses for energizing the lamp corresponding to the combination of energized receiving station relays, and track controlled means governed by a train passing said receiving station to leave the stretch for releasing said energized receiving station relays, and other track controlled means effective to release a particular combination of said receiving station relays when a train passes an intermediate point in said stretch.

RALPH MORDIN.